United States Patent [19]
Swift

[11] Patent Number: 6,035,996
[45] Date of Patent: Mar. 14, 2000

[54] AIR NOZZLE CLEANING SYSTEM FOR A CONVEYOR BELT

[76] Inventor: Randy G. Swift, Rte. 3 Box 193 E, Union, Miss. 39365

[21] Appl. No.: 08/753,741

[22] Filed: Nov. 29, 1996

[51] Int. Cl.[7] .................................................. B65G 45/00
[52] U.S. Cl. ............................................................ 198/495
[58] Field of Search ..................................... 198/495, 493

[56] References Cited

U.S. PATENT DOCUMENTS

| | | | |
|---|---|---|---|
| 1,235,027 | 7/1917 | Harrison | 198/495 |
| 1,793,246 | 2/1931 | Philips | 198/495 |
| 2,266,309 | 12/1941 | Cohen | 198/495 |
| 3,528,259 | 9/1970 | Saal | 198/495 |
| 4,087,320 | 5/1978 | Danahy et al. | 198/495 |
| 4,960,200 | 10/1990 | Pierce | 198/495 |
| 5,333,724 | 8/1994 | Wingfield et al. | 198/495 |
| 5,372,243 | 12/1994 | King | 198/495 |
| 5,598,915 | 2/1997 | Malmberg et al. | 198/495 |
| 5,669,482 | 9/1997 | Mojden et al. | 198/495 |

FOREIGN PATENT DOCUMENTS

| | | | |
|---|---|---|---|
| 2944340 | 5/1981 | Germany | 198/495 |
| 751649 | 7/1980 | U.S.S.R. | 198/493 |
| 1543-439 | 4/1979 | United Kingdom | 198/495 |

*Primary Examiner*—James R. Bidwell
*Assistant Examiner*—Joe Dillon, Jr.

[57] ABSTRACT

A conveyor and coolant cleaner for removing chips from conveyors of CNC lathes and other related types of machine tools includes a blower assembly having at least one nozzle. The conveyor and coolant cleaner further includes mounting structure for positioning the nozzle such that an air stream exiting the nozzle is directed in an upward direction. The air stream is directed against a downwardly-facing return stretch of a conveyor belt so that waste material chips sticking to the conveyor belt are dislodged by the air stream. The waste material chips are then pulled downwardly away from the conveyor belt by gravity.

16 Claims, 3 Drawing Sheets

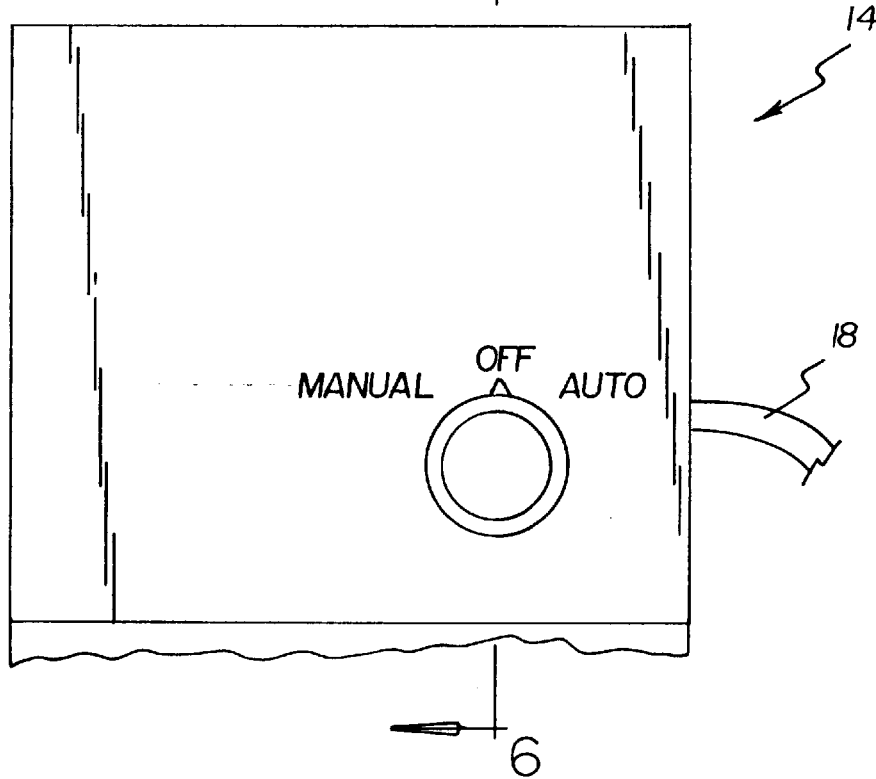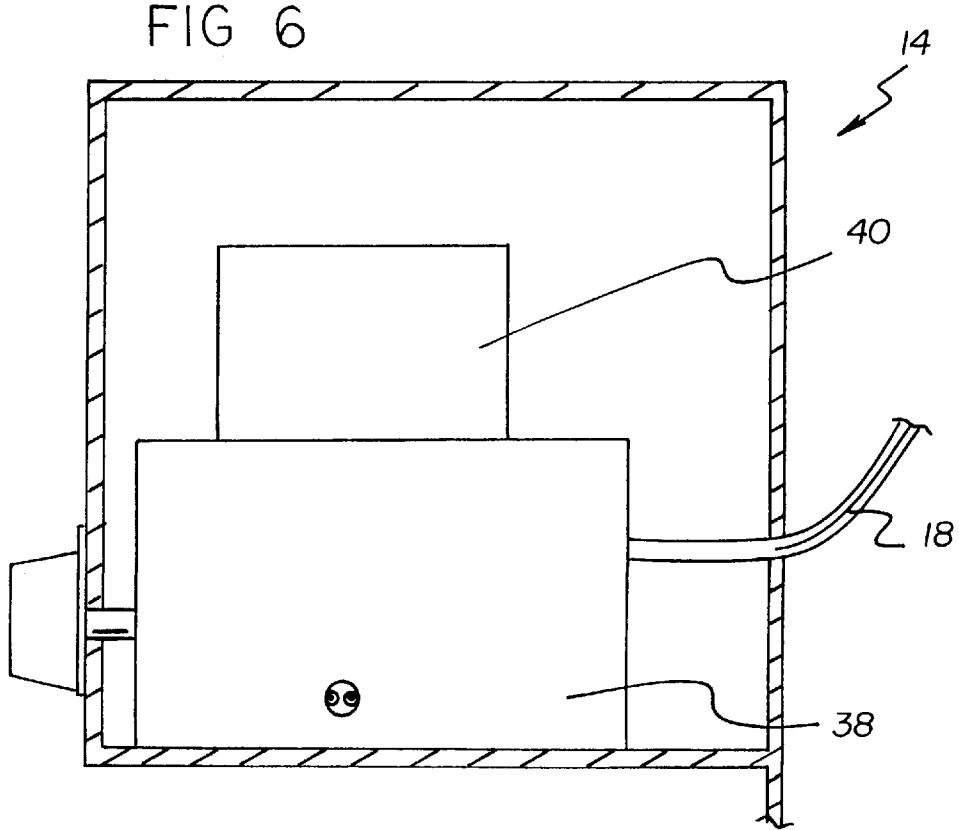

AIR NOZZLE CLEANING SYSTEM FOR A CONVEYOR BELT

BACKGROUND OF THE INVENTION

1. Field of the Invention

The present invention relates to a chip removal system and more particularly pertains to a new Chip Removal System for reliably removing chips from conveyors of CNC lathes and other related types of machines and tools.

2. Description of the Prior Art

The use of a chip removal system is known in the prior art. More specifically, a chip removal system heretofore devised and utilized are known to consist basically of familiar, expected and obvious structural configurations, notwithstanding the myriad of designs encompassed by the crowded prior art which have been developed for the fulfillment of countless objectives and requirements.

Known prior art chip removal systems include U.S. Pat. No. U.S. Pat. No. 5,230,793; U.S. Pat. No. 4,765,894; U.S. Pat. No. 5,158,691; U.S. Pat. No. 5,389,256; U.S. Pat. No. 4,322,992 and U.S. Pat. No. 3,878,103.

While these devices fulfill their respective, particular objectives and requirements, the aforementioned patents do not disclose a new CNC lathe conveyor and coolant cleaner. The inventive device includes a control box, a conveyor motor, a set of connecting wires, a conveyor belt, a conveyor housing, an air solenoid, an air regulatory machine, a supply of air, at least two nozzles, an air line, a timer, and a controller.

In these respects, the CNC lathe conveyor and coolant cleaner according to the present invention substantially departs from the conventional concepts and designs of the prior art, and in so doing provides an apparatus primarily developed for the purpose of reliably removing chips from conveyors of CNC lathes and other related types of machine tools.

SUMMARY OF THE INVENTION

In view of the foregoing disadvantages inherent in the known types of CNC lathe conveyor and coolant cleaner now present in the prior art, the present invention provides a new CNC lathe comveyor and coolant cleaner construction wherein the same can be utilized for reliably removing chips from conveyors of CNC lathes and other related types of machine tools.

The general purpose of the present invention, which will be described subsequently in greater detail, is to provide a new CNC lathe conveyor and coolant cleaner apparatus and method which has many of the advantages of chip removal systems mentioned heretofore and many novel features that result in a new CNC lathe conveyor and coolant cleaner which is not anticipated, rendered obvious, suggested, or even implied by any of the prior art a chip removal system, either alone or in any combination thereof.

To attain this, the present invention generally comprises a control box, a conveyor motor, a set of connecting wires, a conveyor belt, a conveyor housing, an air solenoid, an air regulatory machine, a supply of air, at least two nozzles, an air line, a timer, and a controller.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new CNC lathe conveyor and coolant cleaner apparatus and method which has many of the advantages of the chip removal systems mentioned heretofore and many novel features that result in a new CNC lathe conveyor and coolant cleaner which is not anticipated, rendered obvious, suggested, or even implied by any of the prior art a chip removal system, either alone or in any combination thereof.

It is another object of the present invention to provide a new CNC lathe conveyor and coolant cleaner which may be easily and efficiently manufactured and marketed.

It is a further object of the present invention to provide a new CNC lathe conveyor and coolant cleaner which is of a durable and reliable construction.

An even further object of the present invention is to provide a new CNC lathe conveyor and coolant cleaner which is susceptible of a low cost of manufacture with regard to both materials and labor, and which accordingly is then susceptible of low prices of sale to the consuming public, thereby making such CNC lathe conveyor and coolant cleaner economically available to the buying public.

Still yet another object of the present invention is to provide a new CNC lathe conveyor and coolant cleaner which provides in the apparatuses and methods of the prior art some of the advantages thereof, while simultaneously overcoming some of the disadvantages normally associated therewith.

Still another object of the present invention is to provide a new CNC lathe conveyor and coolant cleaner for reliably removing chips from conveyors of Computer Numeric Control (CNC) lathes and other related types of machine tools.

Yet another object of the present invention is to provide a new CNC lathe conveyor and coolant cleaner which includes a control box, a conveyor motor, a set of connecting wires, a conveyor belt, a conveyor housing, an air solenoid, an air regulatory machine, a supply of air, at least two nozzles, an air line, a timer, and a controller.

Still yet another object of the present invention is to provide a new CNC lathe conveyor and coolant cleaner that utilizes compressed air to blow the chips into a waste container.

Even still another object of the present invention is to provide a new CNC lathe conveyor and coolant cleaner that helps prevent the coolant from becoming contaminated, extend tool insert, life and increase the overall accuracy of the parts produced on a machine thus equipped.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front view of the control box of the present invention.

FIG. 6 is a cross sectional view taken along line 6—6 of FIG.

DESCRIPTION OF THE PREFERRED EMBODIMENT

Figure 1:
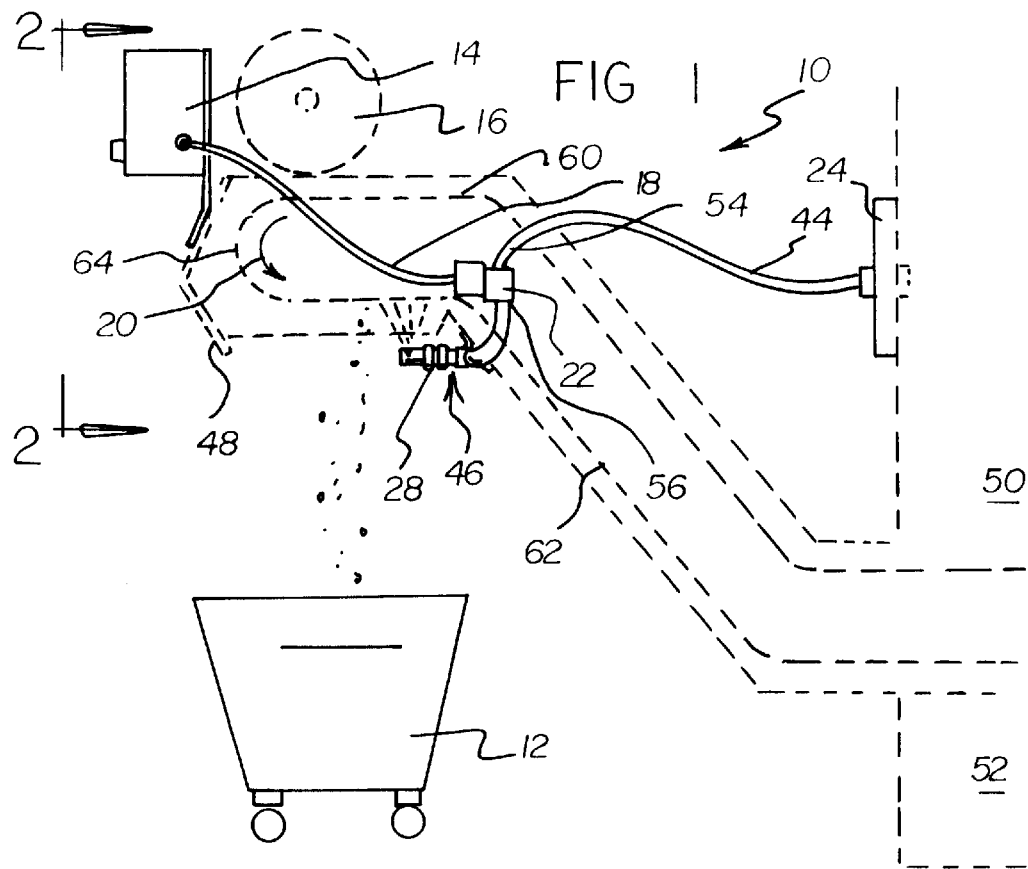
FIG. 1 is a right side elevation view of a new CNC lathe conveyor and coolant cleaner according to the present invention.
Figure 2:
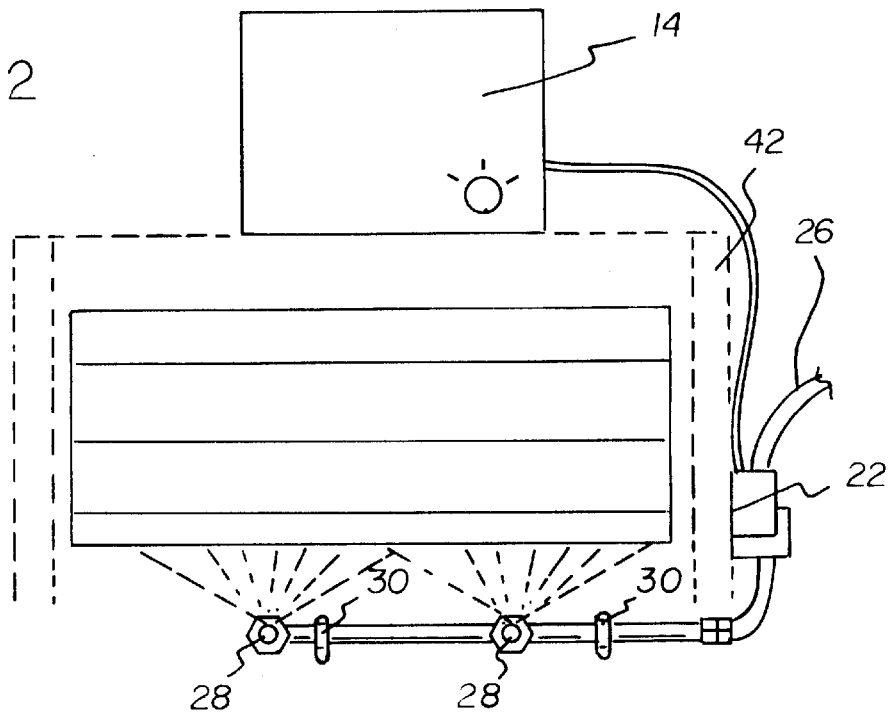
FIG. 2 is a front elevation view thereof as indicated by line 2—2 in FIG. 1.
Figure 3:
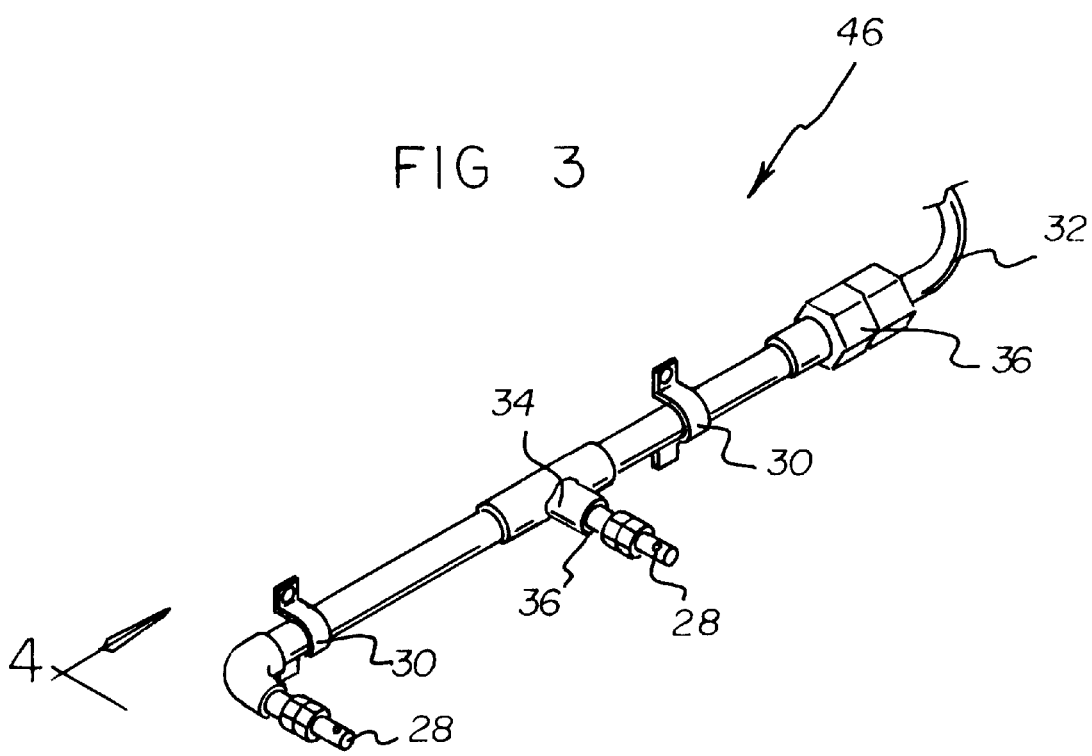
FIG. 3 is a perspective view of the nozzle of the present invention.
Figure 4:
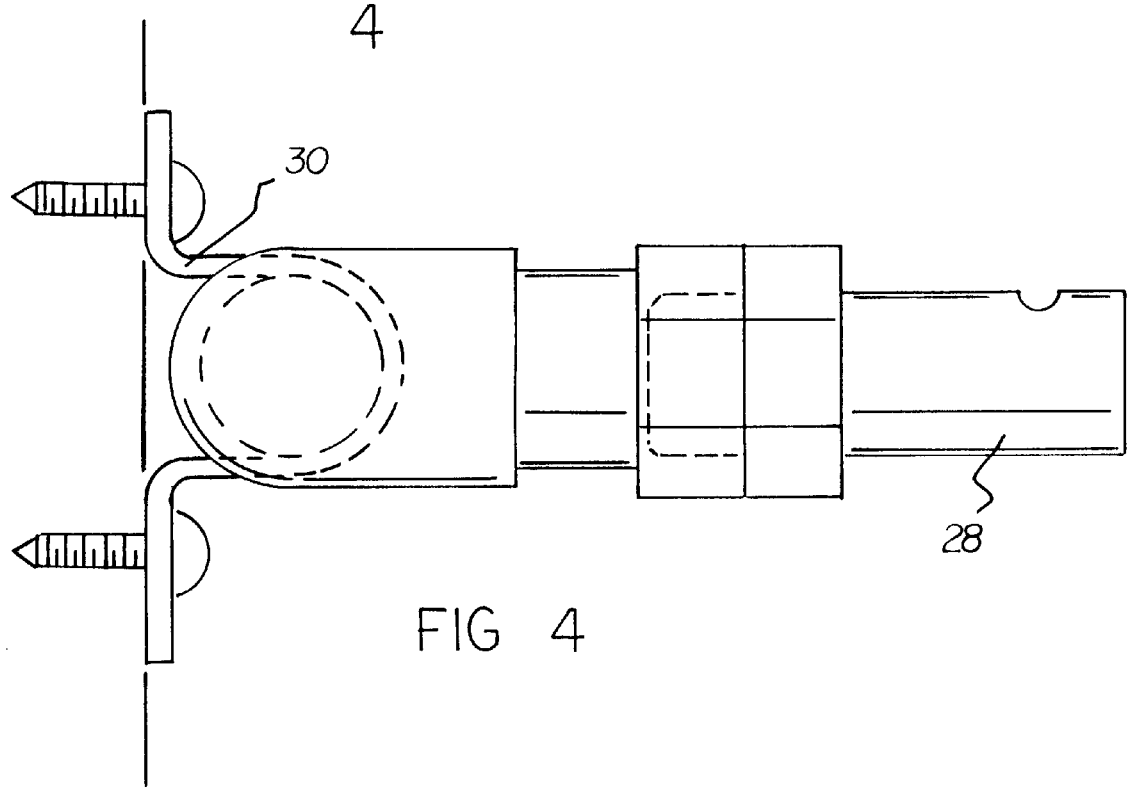
FIG. 4 is a side view of the nozzle of the present invention as indicated by line 4—4 in FIG. 3.

With reference now to the drawings, and in particular to FIGS. 1 through 6 thereof, a new CNC lathe conveyor and coolant cleaner embodying the principles and concepts of the present invention and generally designated by the reference numeral 10 will be described.

More specifically, it will be noted that the CNC lathe conveyor and coolant cleaner 10 comprises a control box, a conveyor motor, a set of connecting wires, a conveyor belt, a conveyor housing, an air solenoid, an air regulatory machine, a supply of air, at least two nozzles, an air line, a timer, and a controller As best illustrated in FIGS. 1 through 6, it can be shown that the present invention has many of the advantages of the chip removal systems mentioned heretofore and many novel features that result in a new CNC lathe conveyor and coolant cleaner which is not anticipated, rendered obvious, suggested, or even implied by any of the prior art chip removal systems, either alone or in any combination thereof.

In use, the present invention is a system that can be used to remove waste material shavings or chips from chip removal conveyor belt 20 such as found on CNC lathes and other similar metal cutting tools. The CNC lathe conveyor and coolant cleaner 10, allows the chips to be removed from the conveyor belt 20. Generally, without a removal system, the chips stick to the conveyor belt 20 because the coolant (e.g., a hydrocarbon lubricating product having high viscosity properties) that usually coats the conveyor belt 20 and the chips will produce an adhesive-like effect causing the chips from the lathes to adhere or stick to the conveyor 20. By using the System 10, chips can be removed from the coolant adhering to the conveyor belt 20 and a significant amount of contaminants can thereby be removed from the coolant. Further, the tool insert life is extended, and the overall accuracy of the parts produced on a machine thus equipped is increased.

The conveyor belt 20 is generally comprised of a upwardly-facing forward stretch 60 and a downwardly-facing return stretch 62. The forward stretch 60 brings waste material chips out of the machine 50 and when the forward stretch reaches an end portion 64 of the conveyor, the conveyor belt 20 makes an approximately 180 degree turn and becomes the return stretch 62. At the end portion 64, the inversion of the conveyor belt 20 will permit gravity to pull some of the chips off of the belt and down into, for example, a waste chip container 12. The stickiness of the coolant causes a quantity of the lighter or smaller chips to remain adhered to the return stretch 62 of the conveyor belt 20, even though there is nothing supporting the chips from below. The present invention facilitates the dislodging of the chips that remain stuck to the return stretch 62 of the belt so that gravity can pull the chips down into a waste chip container 12.

The system 10 is fed air from an air supply means 26. The air supply means can be any flexible hose such as a rubber hose. The air supply is passed through an air regulatory means 24 into a connecting hose 44 which can be of the same material as the air supply means 26. The outer end of the air regulatory means 26 generally is connected to a air solenoid 22 that can be mounted at any position but is preferably mount ed on the outside of the conveyor housing 42. The solenoid 22 is used as a sensing device to turn on and off the air when the conveyor belt 20 starts. While almost any air solenoid in the industry can be used, a solenoid operating on 110–120 VAC electrical power is preferred. The conveyor belt 20 is control led by a motor 16 which moves it into the machine 50 where the conveyor belt 20 surface becomes coated with coolant 52 and material chips falling from a work piece being shaped by the lathe machine 50. The chips become stuck to the conveyor belt 20 by the adhesive effect of the oily coolant.

Significantly, a relatively thin low pressure stream of air is directed at the surface of the conveyor belt 20 via the nozzles 28 at the end of the hose 44. As the air is directed in a thin low pressure stream onto the conveyor belt 20, the chips are dislodged from the surface of the conveyor into the chip container 12. The air flow out of the nozzles 28 is preferably directed to strike the surface of an inverted portion of the conveyor so that chips dislodged from the conveyor belt 20 by the air stream are pulled downward and away from the conveyor by gravity into a chip catching receptacle such as the wheeled chip container 12.

The air flow or stream is preferably directed at the conveyor belt in a substantially fan-shaped or conical flow pattern so that air strikes the conveyor surface in a perpendicular orientation and at a range of angles up to about 45 degrees with respect to the surface of the conveyor belt. This conical flow pattern is elliptical in cross-section with a length as much as two to three times its width.

The most preferred spacing of the nozzle 28 from the surface of the conveyor belt 20 is at least about one inch to provide a relatively wide area of conveyor surface coverage while still applying a sufficient blowing force to the chips to dislodge a significant portion of the chips that remain adhered to the conveyor belt. The maximum spacing between the nozzle 28 and the surface of the conveyor belt 20 depends, in part, upon the air pressure developed in the blower assembly 46 and, as a result, the force of the air stream exiting the nozzle 28. When the air pressure is increased, the spacing between the nozzle 28 and the conveyor belt may be increased, but preferably the spacing therebetween does not exceed about five inches. The most preferred air pressure developed in the blower assembly is less than about 70 pounds per square inch (psi). Air pressures greater than about 70 psi may be used, but greater noise levels and excessive chip travel may result.

A shielding means 48 which can be made of vinyl plastic or metal can be installed adjacent to the portion of the conveyor located near the nozzles 28 (e.g., at the end portion 64 of the conveyor line 20) to help direct the dislodged chips into the chip container 12 and to protect nearby personnel and equipment from the flying chips.

The control box 14 ideally features a rotary switch with three positions (e.g., off, manual and automatic). The "automatic" position activates a timer 38 which can be adjustably set to operate the conveyor 20 and the blower assembly 46 intermittently. The blower assembly and conveyor are turned on for a predetermined "on" belttime period and then turned off for a predetermined "off" time period. The blower assembly 46 can be supported on the underside of the conveyor belt 20 by at least one strapping means 30.

The blower assembly 46 includes at least one nozzle 28, but preferably includes at least a pair of nozzles positioned at laterally spaced locations along an axis transverse to the longitudinal extent of the conveyor belt. Optionally, more than two nozzles may be used if the width of the conveyor belt requires more air flow to insure sufficient air flow to dislodge the chips from the full width of the conveyor surface. The preferred blower assembly 46 utilizes at least one nozzle 28 for every about seven to eight inches of lateral width of the conveyor belt (i.e., the lateral width being measured perpendicular to the longitudinal endless extent of the conveyor belt 20). Greater spacing between nozzles generally requires greater air pressure in the blower assembly. Lighter weight chips (such as with less dense materials or with smaller chip sizes) will generally require a greater number of nozzles than heavier waste chips (which are more easily pulled away by gravity.

At least one strapping means 30 is employed to hold the blower assembly 46 in position, and an air line 32 is employed to supply the air and a series of quick connecting means 34 that are used to connect flexible rubber air line 32 to the metal or rigid plastic nozzles 28. The nozzle 28 is preferably attached to the air line 32 by a threaded means 36 which is embedded in the portion of the connecting means 34 that is at an angle of about 90° to the air line 32. The strapping means 30 can be plastic or metal. Each nozzle 28 is connected to an air line 32 which is made of a flexible material such as rubber or a flexible plastic.

Optionally, the blower assembly 46 may comprise a manifold (not shown) having multiple spaced holes facing the return stretch 62 of the conveyor belt 20. The holes may then be selectively fitted with nozzles or plugs according to the desired number of air streams desired to contact the chips for the particular operating conditions (e.g., amount of coolant, weight of waste material chips, and size and speed of conveyor).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A conveyor system, comprising:
   a conveyor having a movable endless conveyor belt mounted thereon with an upward-facing forward stretch of conveyor belt and a downward-facing return stretch of conveyor belt, said conveyor further including an end roller about which said conveyor belt is wrapped, said end roller being positioned at the transition between said upward-facing forward and said downwardly-facing return stretches of said conveyor belt; and
   a blower assembly having nozzle means for producing a substantially fan shaped air stream, said blower assembly being positioned below the downward-facing stretch of conveyor belt in a manner so that the air stream produced by said nozzle means blows in a substantially upward direction against a portion of the return stretch, such that the air stream any chips of waste material sticking to the return stretch as said return stretch moves relative to said nozzle means to thereby facilitate dislodging of said chips from said conveyor belt, said nozzle means being positioned to direct said air stream against a substantially horizontal portion of said return stretch such that the downward-facing surface of said return stretch blocks any upward movement of the dislodged chips;
   wherein said nozzle means comprises a nozzle adapted to produce a substantially fan-shaped air stream pattern on the surface of said downward-facing return stretch of conveyor belt, said pattern having a length substantially transverse to the direction of movement of said conveyor belt and a width oriented substantially parallel to the direction of movement of said conveyor belt, the length of said pattern having a greater measurement than the width of said pattern,
   wherein the nozzle is positioned at a first horizontal distance from the end roller of said conveyor, and wherein said nozzle is adapted to produce an air stream pattern which contacts the downward-facing stretch of the conveyor at a second horizontal distance from said end roller, the second horizontal distance being less than the first horizontal distance so that the air stream contacts and dislodges chips between the end roller and the portion of the downward-facing stretch located vertically above the nozzle.

2. The system of claim 1 wherein said blower assembly includes solenoid means for selectively supplying pressurized air to the nozzle means of said blower assembly.

3. The system of claim 1 additionally comprising control means for selectively controlling operation of the solenoid means of said blower assembly.

4. The system of claim 1 wherein said control means includes adjustable timer means for intermittently activating said solenoid means to supply pressurized air to said nozzle means for a predetermined time period.

5. The system of claim 1 additionally comprising shielding means for intercepting chips of waste material dislodged from said conveyor belt by the air stream from said blower assembly, said shielding means being positioned adjacent to the end roller of said conveyor belt, said shielding means further including a substantially V-shaped plate.

6. The system of claim 1 wherein said nozzle means comprises at least two nozzles, said nozzles being spaced from each other in a direction transverse to the direction of movement of said conveyor belt.

7. The system of claim 1 wherein the conveyor belt has a width perpendicular to the endless extent of said conveyor belt, and wherein said nozzle means comprises a plurality of spaced nozzles aligned in a direction transverse to the direction of movement of said conveyor belt, each of said plurality of spaced nozzles positioned such that the full conveyor belt width is contacted by at least one of the air streams produced by said nozzles, said nozzle means comprising at least one nozzle for each eight inches of conveyor belt width.

8. The system of claim 1 wherein said conveyor includes an end portion where the upward-facing forward stretch of conveyor belt changes direction and becomes the downward-facing return stretch of the conveyor belt, said blower assembly being positioned near the end portion of said conveyor such that said air stream contacts chips of waste material that remain stuck to said conveyor belt said end portion of the conveyor.

9. The system of claim 1 wherein said nozzle means comprises a nozzle located at least about one inch from the conveyor belt.

10. The system of claim 1 wherein said nozzle means comprises a nozzle located less than about five inches from the conveyor belt.

11. The system of claim 1 wherein the length of the fan-shaped air stream pattern is at least three times greater than the width of said pattern.

12. The system of claim 1 wherein the nozzle directs the air stream in a direction substantially perpendicular to the downward facing surface of the return stretch of the conveyor belt.

13. A system for removing chips of waste material sticking to the moving conveyor belt of a conveyor, said conveyor belt being of the type having a substantially horizontal upward-facing forward stretch of conveyor belt and a substantially horizontal downward-facing return stretch of conveyor belt, said conveyor further including an end roller about which said conveyor belt is wrapped with said end roller being positioned at the transition between said upward-facing forward and said downwardly-facing return stretches, said system comprising:

a blower assembly having nozzle means for producing an air stream; and mounting means for positioning the nozzle means of said blower assembly below the downward-facing stretch of conveyor belt in a manner so that an air stream produced by said nozzle means blows in a substantially upward direction against a portion of the return stretch such that the air stream contacts any chips of waste material sticking to the return stretch as the return stretch moves relative to said nozzle means to thereby facilitate dislodging of said chips from said conveyor belt, said nozzle means being positioned to direct said air stream against a substantially horizontal portion of said return stretch such that the downward-facing surface of said return stretch blocks any upward movement of the dislodged chips;

wherein said nozzle means comprises at least two nozzles each being adapted to produce a substantially fan-shaped air stream pattern having a length and a width oriented perpendicular to each other, wherein the length of said pattern is oriented substantially transverse to the direction of movement of said conveyor belt, the length of said pattern being at least twice the width of said pattern, wherein said blower assembly includes a solenoid means for selectively supplying pressurized air to the nozzle means of said blower assembly and control means for selectively controlling operation of the solenoid of said blower assembly, said control means including adjustable timer means for intermittently activating said solenoid to supply pressurized air to said nozzle means for a predetermined time period.

14. The system of claim 13 wherein said nozzle means comprises a nozzle located at least about one inch from the conveyor belt.

15. The system of claim 13 wherein said nozzle means comprises a nozzle located less than about five inches from the conveyor belt.

16. A system for removing chips of waste material sticking to a moving conveyor belt of a conveyor, comprising in combination:

a conveyor having a conveyor belt having an upward-facing forward stretch of conveyor belt and a substantially horizontal downward-facing return stretch of conveyor belt, said conveyor further including an end roller about which said conveyor belt is wrapped, said end roller being positioned at the transition between said upward-facing forward and said downwardly-facing return stretches of said conveyor belt; and a blower assembly having nozzle means for producing a substantially fan shaped air stream, said blower assembly being positioned below the downward-facing stretch of conveyor belt in a manner so that the air stream produced by said nozzle means blows in a substantially upward direction against a portion of the return stretch such that any chips of waste material sticking to the return stretch as said return stretch moves relative to said nozzle means to thereby facilitate dislodging of said chips from said conveyor belt, said nozzle means being positioned to direct said air stream against a substantially horizontal portion of said return stretch such that the downward-facing surface of said return stretch blocks upward movement of the dislodged chips;

wherein said nozzle means comprises at least two nozzles, each nozzle being adapted to produce a substantially fan-shaped air stream pattern on the surface of said downward-facing return stretch of conveyor belt, said pattern having a length substantially transverse to the direction of movement of said conveyor belt and a width oriented substantially parallel to the direction of movement of said conveyor belt, the dimension of the length of said pattern being at least three times the dimension of the width of said pattern;

wherein the nozzle is positioned at a first horizontal distance from the end roller of said conveyor, and wherein said nozzle is adapted to produce an air stream pattern which contacts the downward-facing stretch of the conveyor at a second horizontal distance from said end roller, the second horizontal distance being less than the first horizontal distance so that the air stream contacts and dislodges chips between the end roller and the portion of the downward-facing stretch located vertically above the nozzle;

wherein said blower assembly includes a solenoid for selectively supplying pressurized air to the nozzle means of said blower assembly and control means for selectively controlling operation of the solenoid, said control means including an adjustable timer means for intermittently activating said solenoid to supply pressurized air to said nozzle means for a predetermined time period;

shielding means for intercepting chips of waste material dislodged from said conveyor belt by the air stream from said blower assembly, said shielding means being positioned adjacent to the end roller of said conveyor belt, said shielding means including a substantially V-shaped plate;

said nozzle means being positioned between about one inch from the conveyor belt and less than about five inches from the conveyor belt for providing sufficient air stream force while preventing buildup of chips of waste material on the nozzle means; and said conveyor belt having a width perpendicular to the endless extent of said conveyor belt, and wherein said nozzle means includes at least one nozzle for each eight inches of conveyor belt width.

* * * * *